Figure 1:
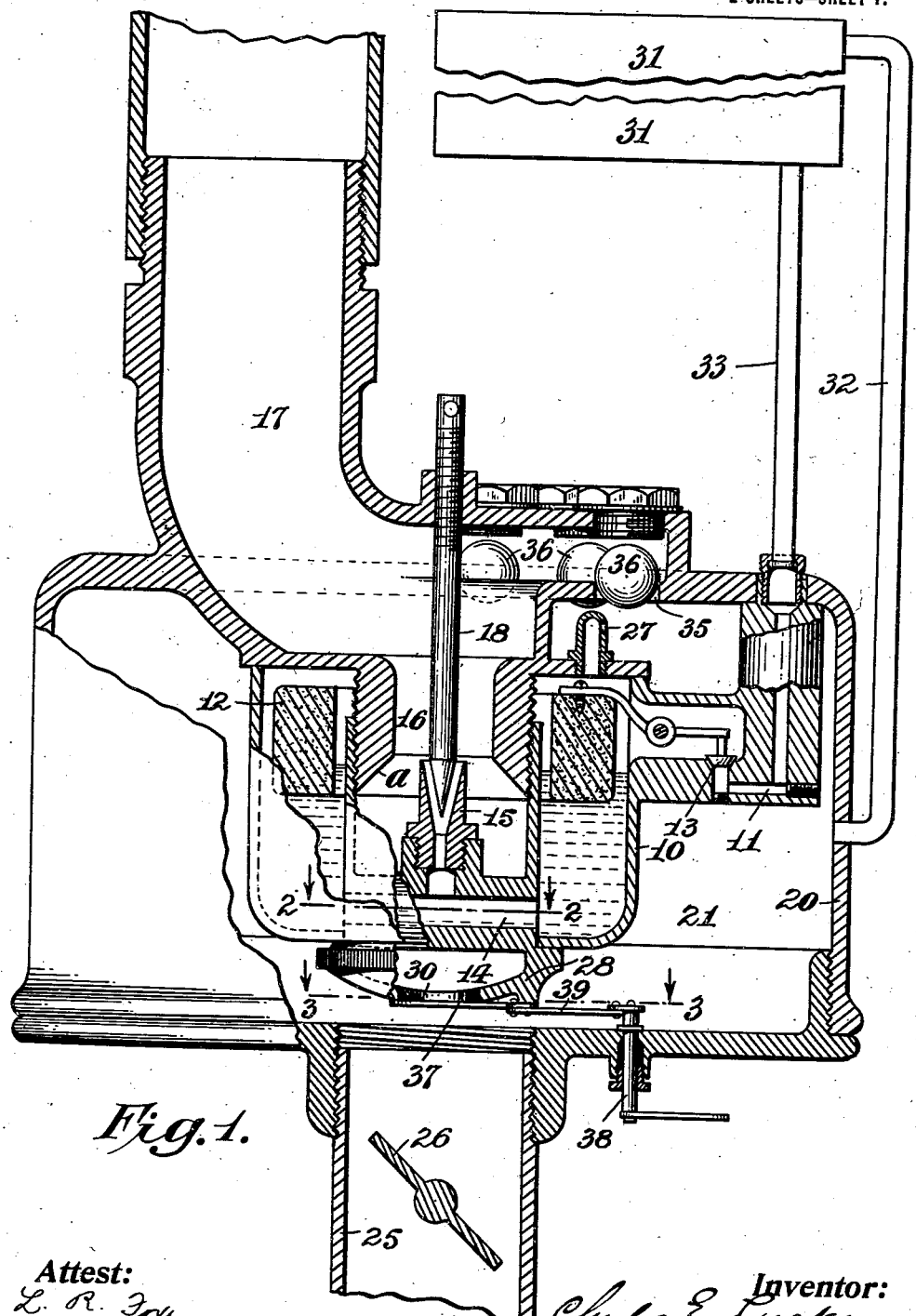

C. E. LUCKE.
CARBURETER.
APPLICATION FILED JAN. 8, 1913. RENEWED JUNE 1, 1918.

1,291,040.

Patented Jan. 14, 1919.
2 SHEETS—SHEET 1.

Attest:
L. R. Fox.
William S. Constant

Inventor:
Charles E. Lucke
by Arthur L. Kent
his Atty.

C. E. LUCKE.
CARBURETER.
APPLICATION FILED JAN. 8, 1913. RENEWED JUNE 1, 1918.

1,291,040.

Patented Jan. 14, 1919.
2 SHEETS—SHEET 2.

Attest:
L. R. Fort
William S. Constant

Inventor:
Charles E. Lucke
by Arthur L. Kent
his Atty.

UNITED STATES PATENT OFFICE.

CHARLES E. LUCKE, OF NEW YORK, N. Y., ASSIGNOR TO GAS AND OIL COMBUSTION COMPANY, OF NEW YORK, N. Y., A CORPORATION OF DELAWARE.

CARBURETER.

1,291,040.  Specification of Letters Patent.  Patented Jan. 14, 1919.

Application filed January 8, 1913, Serial No. 740,885. Renewed June 1, 1918. Serial No. 237,819.

*To all whom it may concern:*

Be it known that I, CHARLES E. LUCKE, a citizen of the United States, residing at New York city, in the county of New York and State of New York, have invented certain new and useful Improvements in Carbureters, fully described and represented in the following specification and the accompanying drawings, forming a part of the same.

This invention relates to carbureters and more particularly to a carbureter which is adapted to sustain a continuous flow of explosive mixture when required and to supply the explosive mixture under any desired pressure. The invention aims to provide an improved carbureter adapted to sustain a flow of an explosive mixture of constant or substantially constant richness irrespective of variation in the volume or rate of flow; and the invention aims more especially to provide a carbureter adapted to supply the explosive mixture under pressure greater than atmosphere, and to maintain the proportions or richness of the mixture so supplied constant or substantially constant irrespective of variations in the volume or rate of flow, and irrespective also of variation in the pressure with which the mixture is supplied.

The invention includes means whereby, under varying rates of air flow through the carbureter and under variations in pressure, the supply of fuel to the mixing chamber of the carbureter is automatically maintained proportionate to, or substantially proportionate to, the amount of air passing therethrough. The invention has been embodied in a carbureter of the constant level type, that is, of the type in which the volatile liquid fuel is maintained at a constant level in a receptacle from which it passes into the mixing or carbureting chamber. While not necessarily limited in all its features to a carbureter of this type, the invention includes means whereby in a carbureter of this type increase or decrease in the pressure in the mixing chamber of the carbureter is accompanied by an increase or decrease respectively of the pressure on the liquid in the fuel receptacle; and means whereby the relation between the pressure in the mixing chamber and the pressure in the fuel receptacle under which the fuel liquid flows to the mixing chamber is automatically controlled to vary the supply of fuel with variations in the amount of air passing through the mixing chamber and independently of the pressure under which the mixture is supplied by the carbureter. The invention includes, also, means whereby pressures in excess of atmospheric pressure are maintained within the mixing chamber and on the liquid in the fuel receptacle and a difference in the pressures at these two points is maintained with the preponderating pressure in the fuel receptacle to cause the fuel to flow to the mixing chamber. The invention comprises, further, means for automatically controlling this difference or variance between the pressure in the mixing chamber and the pressure on the liquid in the fuel receptacle whereby it is so varied with variations in the air flow as to cause the fuel to be supplied to the mixing chamber in amount proportionate to, or substantially proportionate to, the amount of air passing therethrough. The invention includes also other features of construction and combinations of parts hereinafter described and particularly set forth in the claims.

Figure 2:
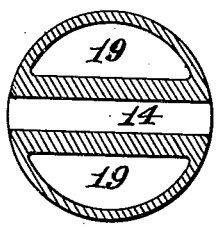
Figure 3:
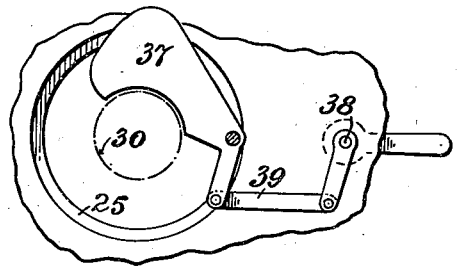

An understanding of the invention can best be given by a detailed description of a carbureter embodying the various features of the invention in a preferred form in connection with drawings showing such a preferred embodiment of the invention, and such a description will now be given in connection with the accompanying drawings, in which:

Figure 1 is a central vertical sectional view of a carbureter made in accordance with my invention, parts being shown in elevation; and Figs. 2 and 3 are detail sectional views taken on lines 2—2 and 3—3 respectively of Fig. 1.

Figure 4:
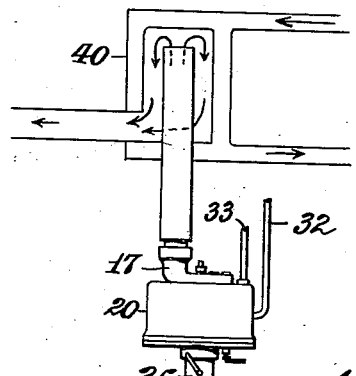

Fig. 4 is a reduced scale view of the carbureter in elevation provided with a heater shown diagrammatically.

Referring to the drawings, in the form of carbureter shown, I provide a tank or receptacle 10 to which the volatile liquid fuel is supplied through a conduit 11, suitable means for maintaining a constant level of the liquid in the tank 10 being provided, as, the usual float 12 in the tank connected to actuate a valve 13 for controlling the supply of fuel liquid to the tank. Communicating with the tank 10 through a passage 14, is an outlet or nozzle 15, the discharge end of which extends a little above the normal level of the fuel liquid in the tank, and the flow from which is controlled by an adjustable needle valve 18. The nozzle discharges into a mixing passage or chamber 16 which communicates with an offtake pipe 17. The tank 10 is conveniently made of annular form with its inner walls forming the walls of the mixing passage or chamber located centrally of the tank, the nozzle extending upward axially of the mixing chamber and terminating at a point intermediate the top and bottom thereof. The supply passage 14 is shown as bridging the lower part of the mixing chamber, opening at each end to the tank 10 and leaving an opening or passage way 19 on each side through which air is supplied to the mixing chamber. To secure a better carbureting action, the mixing chamber or passage is constricted adjacent the discharge end of the nozzle, as at $a$, so as to converge the air column and cause a stronger flow across the discharge edges of the nozzle. The tank 10 is mounted within a casing 20 which provides an air chamber 21 between its walls and the tank and with which the mixing chamber communicates through the openings or passage ways 19. There is no special object aside from convenience in construction and symmetry in design in providing an annular air chamber, but it is desirable because of its steadying action on the operation of the carbureter to provide an air chamber of comparatively large size. The tank 10 is in constant communication with the air chamber 21 through a port 27 whereby the pressure on the liquid in the tank will always be that of the air in the chamber 21. This port may also serve as an overflow outlet for the tank 10. Air is supplied to the carbureter through a supply pipe 25 communicating with any desired source of supply of air under suitable pressure and opening into the air chamber 21 preferably at a point directly beneath the mixing chamber 16. The supply pipe is provided with a throttle valve or damper 26 for controlling the supply of air to the carbureter and the amount and pressure of the combustible mixture passing from the carbureter through the offtake 17.

The passage of the fuel liquid from the tank 10 through the nozzle into the mixing passage or chamber 16 when the carbureter is in operation is secured by maintaining a difference in the pressures in the mixing chamber and on the liquid in the tank 10. For securing such difference in pressures with the pressure in both places depending upon the same source or supply of air, I provide pressure reducing means for reducing the pressure in the mixing chamber below that exerted on the liquid in the tank 10. To provide such pressure reducing means, I form the carbureter with a restricted orifice between the mixing chamber and the immediate source of supply, the air chamber 21 in the construction shown. This orifice should be of such relative size as to offer sufficient resistance to the flow of air therethrough to secure the necessary drop in air pressure to maintain the desired difference between the pressures in the mixing chamber and in the tank 10. This orifice might be formed by the openings or passage ways 19 about the supply passage 14 in the construction shown, but I preferably provide a partition or bottom plate 28 below the passage ways 19 having an opening or port 30 which forms the restricted orifice for causing the air to expand into the mixing chamber or passage to give the desired drop in pressure.

In order that the fuel liquid may flow into the tank 10 when the valve 13 is opened, it is necessary that the liquid be supplied to reach the valve under a pressure in excess of the pressure in the tank, and to secure a uniform supply of the liquid to the tank under varying air pressures in the tank it is desirable that the excess pressure on the liquid in the supply passage 11 over the tank pressure be maintained constant. For varying the liquid supply pressure with variations in the air pressure in the tank 10, so that such excess pressure shall be maintained constant, I provide in the construction shown a closed tank or reservoir 31 which is connected with the air chamber 21 or tank 10 by a pressure equalizing pipe 32 and from which the fuel liquid is supplied through a pipe 33 connecting with the supply passage 11 of the carbureter, the tank 31 being elevated sufficiently above the carbureter to cause the liquid to reach the valve 13 under the desired excess pressure.

When the carbureter is in use and air is flowing through the mixing passage or chamber 16, the air pressure in the air chamber 21 and tank 10 will be greater than that in the mixing chamber, and this difference in pressure will cause the gasolene or other fuel liquid to rise in the nozzle 15 and be discharged into the mixing chamber where it meets the air current passing the nozzle and is more or less completely vaporized therein, the mixture thus formed then passing through the offtake 17 to the place of use.

The quantity of air that will flow through the carbureter depends upon the supply pressure in the pipe 25 and the resistance at the ultimate outlet where the mixture burns and the intermediate resistances including the resistances encountered within the carbureter, which latter are not very great. Thus with a given supply pressure and a given setting of the damper 26, the amount of air that will flow through will depend almost entirely on the resistance beyond the carbureter or at the ultimate outlet, and with a given resistance beyond the carbureter, such for example as would be caused by fixed orifices discharging to the atmosphere, increase of air flow will be secured by opening the damper 26 and decrease of flow by closing the damper. Because of the restriction between the air chamber 21 and the mixing chamber, change in the air flow changes the difference between the pressure in the mixing chamber and the pressure acting on the liquid in the tank 10, an increased flow causing an increase of this difference in pressures and a decreased flow lessening the difference in pressures.

The supply of fuel liquid to the mixing chamber through the nozzle 15 is primarily adjusted by means of the valve 18 to the quantity necessary to form with the amount of air passing the nozzle an explosive mixture of the desired strength or proportions, screwing the valve down decreasing the flow of fuel liquid and weakening the mixture, and screwing it up increasing the flow and giving a richer mixture. Having once set the valve to secure the desired proportions for some one rate of flow, the apparatus will operate to maintain such proportions and supply a mixture of substantially constant richness for other rates of flow resulting from moving the damper or throttle 26 or changing the supply pressure or changing the resistance beyond the mixing chamber, that is, as the air flow through the carbureter increases or decreases, the amount of fuel liquid supplied to the mixing chamber will also be proportionately increased or decreased. For conditions involving an average air-flow through the carbureter widely different from that for which the nozzle valve has been set, it may be desirable for best results to reset the nozzle valve for a pressure difference approximating the pressure difference or the average pressure difference of the particular new condition of use; and it may sometimes be desirable, also, where extreme nicety in adjustment of proportions is desired to resort to the hand adjustment by means of the valve 18 to meet varying air-flows.

The automatic increase or decrease in flow of fuel liquid from the tank 10 through the nozzle into the mixing chamber with an increase or decrease in the air flow through the mixing chamber results from the increase or decrease in the difference in pressures in the mixing chamber and the tank 10 or air supply chamber 21 which occurs with an increase or decrease in air flow through the carbureter as before pointed out, that is, when there is a comparatively large flow of air through the carbureter the pressure in the mixing chamber will be lower than that in the air chamber and tank 10 by a greater amount than for relatively smaller rates of air flow through the carbureter. While this variation in the difference in air pressures in the mixing chamber and in the fuel liquid supply chamber causes a variation in the supply of fuel liquid to the mixing chamber which results in maintaining under varying conditions of air flow a nearly constant proportion of fuel and air in the mixture leaving the carbureter, it is found that the supply or flow of fuel liquid to the mixing chamber under the influence of this varying difference in pressures does not vary exactly in proportion to the variation in the air flow. With a carbureter having only the parts or features so far described, when the valve 18 is adjusted, for example, for comparatively small rates of flow, then as the flow is increased, as by further opening the damper or throttle 26, the supply of fuel liquid to the mixing chamber also increases, but the increase in flow of fuel liquid is somewhat faster or in excess of the increase in air-flow, so that after a comparatively high rate of air-flow has been established there may be a substantial excess of fuel in the delivered mixture over the proportions for which the apparatus was originally set, and this excess may be so great as to call for a resetting of the nozzle valve 18. Conversely, reduction in the air-flow through the carbureter is accompanied by an excessive reduction in the supply of fuel liquid to the mixing chamber which may cause an appreciable weakening of the mixture supplied by the carbureter.

In order to compensate for such disproportionate variation in the flow of fuel liquid to the mixing chamber under the influence of a varying air-flow through the carbureter, I provide means for by-passing air from the air supply on the tank side of the nozzle to the offtake or mixing chamber, or the air space on the discharge side of the nozzle, and means for controlling such by-pass by the difference in pressures on the two sides of the nozzle. For this purpose I provide one or more ports leading from the air chamber 21 to a space opening into the offtake 17 or mixing chamber 16 which ports are controlled by check valves. Preferably I provide a series of graduated circular openings or ports 35 forming valve seats controlled by ball valves 36 of graduated diameters so that the volume of air passing from the chamber 21 through the ports will be suitably proportioned to the variance in the difference in pressures at opposite sides of the nozzle 15. When the carbureter is provided with such an automatically controlled by-pass, when a high rate of flow has been established through the carbureter causing such an increase in the difference between the pressures in the mixing chamber and in the tank 10, or on the two sides of the nozzle, as results in a disproportionately increased flow of fuel liquid to the mixing chamber, then this increase in the difference in pressures will cause the lifting of one or more of the check valves 36 according to the amount of the increase in pressure difference, and this lifting of the check valves has the result of bringing the proportions of fuel liquid and air in the mixture back to the desired proportions. The opening of the check valves restores the proportions in the mixture by a double action. The mixture passing out through the offtake 17, which has an excessive amount of fuel, is diluted by the air passing from the chamber 21 through the valve ports directly to the offtake, and at the same time the opening of the check valves has the effect of reducing the excess of pressure in the air chamber 21 and tank 10 over that in the mixing chamber, thereby reducing the driving force on the fuel liquid. In other words, the opening of the check valves under excessive pressure difference which causes an excess flow of fuel liquid results in adding air to the too rich mixture and in reducing the flow of fuel to the mixing chamber. The check valves also serve to minimize fluctuations in the quality of the mixture which might result from sudden increases in the air pressure on the supply side of the carbureter or sudden decreases in pressure on the delivery side.

The supply of fuel liquid to the mixing chamber is thus automatically controlled in my carbureter by causing the pressure on the fuel liquid in the tank or receptacle 10 to be increased and decreased with increase and decrease respectively of the pressure in the mixing chamber, thereby maintaining the desired flow under varying pressures in the system; by increasing and decreasing the difference in pressure between the mixing chamber and the tank 10 with increase and decrease respectively in air-flow through the mixing chamber, thereby maintaining the supply of fuel to the mixing chamber proportionate, or approximately proportionate, to the amount of air passing through the mixing chamber; and by compensating for disproportionate variation in the pressure difference between the mixing chamber and the tank 10 which would cause disproportionate variation in fuel supply to the mixing chamber by means controlled by the pressure difference and acting to modify the variations in such pressure difference, such means as shown operating to by-pass air from the air supply on the tank side of the nozzle to the offtake or mixing chamber, or the air space on the discharge side of the nozzle.

It is apparent, therefore, that with my carbureter the proportions of fuel and air in the mixture delivered may for a wide range of air-flow be kept automatically within the explosive range and very close to the chemical combining proportions so desirable for combustion. Any departure from the desired proportions in the mixture delivered due to failure to be absolutely correct in the automatic adjustment provided may be corrected by hand adjustment of the needle valve 18.

As an additional means for adjusting the proportions of fuel and air in the mixture delivered by the carbureter, the carbureter may, when desired, be provided with means, which in the carbureter shown is manually adjustable, for adjusting the size of the restricted orifice through which the air is caused to expand into the mixing chamber. Such adjusting means is shown in the drawings for adjusting the size of the opening or port 30, being formed by a shutter plate 37 mounted to swing across the opening or port 30 and adjusted by means of a turn rod 38 extending through the bottom of the casing 20 and carrying an arm connected by a link 39 with the shutter. By turning the rod 38 one way or the other, the shutter may be moved to lessen or increase the effective size of the port 30. Increasing the size of the port will decrease the resistance offered to the air-flow therethrough and, therefore, decrease the difference in pressure between the mixing chamber and the air chamber and decrease the supply of fuel, and making the port smaller will increase the resistance and increase the difference in pressure and cause an increased flow of the liquid to the mixing chamber. The shutter 37 thus serves as a means for adjusting the difference in pressure between the mixing chamber and the tank 10, and, therefore, also as a means for controlling the flow of fuel liquid to the mixing chamber. It might thus serve the purpose of the needle valve 18, but such relative pressure controlling means is preferably employed in connection with the needle valve or its equivalent whereby the flow capacity of the nozzle is directly controlled, as I am thereby enabled to adjust the carbureter more suitably so as to secure more accurate automatic control of the supply of fuel under some conditions of use.

For operating with the less volatile fuel liquids, heating means may be provided for heating the fuel to cause it to volatilize more completely in the air with which it is mixed. Such heating means is preferably arranged to act on the mixture, rather than on the air or on the liquid before reaching the mixing chamber. As shown in Fig. 4 of the drawings, the mixture is heated after leaving the mixing chamber by being caused to pass through a heater 40 (which is shown diagrammatically) interposed in the offtake passage 17. When provided with such heating means, the carbureter will operate successfully with kerosene, and such heating means may also be employed for operating with alcohol.

My carbureter is particularly adapted for use where a sustained flow of the mixture is required and where the mixture must be supplied under pressure at the point of consumption, and has been especially designed for use in supplying an explosive mixture to a fire bed in which localized and continuous combustion of the mixture is maintained. The carbureter may obviously, however, be applied to other uses for which it may be found suitable, and is adapted for supplying the mixture under practically any desired pressure, and to supply consuming apparatus requiring a discontinuous flow as well as one needing a sustained or continuous flow.

It is to be understood that the invention is not to be limited to the exact combination and arrangement of parts in the preferred construction shown in the drawings and to which the foregoing description has been largely confined, but that it includes changes and modifications thereof within the claims, it being apparent that the construction shown may be varied without departing from the spirit and scope of the invention.

What is claimed is:

1. An apparatus for supplying a continuous flow under pressure greater than atmosphere of an approximately uniform mixture of compressed air and the vapor of liquid fuel, comprising a mixing chamber having an air inlet and a mixture outlet, means for supplying compressed air to the mixing chamber through the air inlet, means for supplying volatile liquid fuel to the mixing chamber under a maintained pressure greater than the air pressure in the mixing chamber, means for increasing and decreasing the pressure under which the fuel liquid is supplied with increase and decrease, respectively, of pressure in the mixing chamber, and means for increasing and decreasing the difference between the pressure in the mixing chamber and the pressure under which the fuel liquid is supplied with increase and decrease, respectively, of air flow through the mixing chamber.

2. An apparatus for supplying a continuous flow under pressure greater than atmosphere of an explosive gaseous mixture of compressed air and the vapor of liquid fuel, comprising a mixing chamber having an air inlet and a mixture outlet, means for supplying compressed air to the mixing chamber through the air inlet, means for supplying volatile liquid fuel to the mixing chamber under a maintained pressure greater than the air pressure in the mixing chamber, means for increasing and decreasing the pressure under which the fuel liquid is supplied with increase and decrease, respectively, of pressure in the mixing chamber, means for increasing and decreasing the difference between the pressure in the mixing chamber and the pressure under which the fuel liquid is supplied with increase and decrease, respectively, of air flow through the mixing chamber, and adjusting means for varying said pressure difference independently of change in air flow through the mixing chamber.

3. An apparatus for supplying a continuous flow under pressure greater than atmosphere of an explosive gaseous mixture of compressed air and the vapor of liquid fuel, comprising a mixing chamber having an air inlet and a mixing outlet, means for supplying compressed air to the mixing chamber through the air inlet, means for supplying volatile liquid fuel to the mixing chamber under a maintained pressure greater than the air pressure in the mixing chamber, means for increasing and decreasing the pressure under which the fuel liquid is supplied with increase and decrease, respectively, of pressure in the mixing chamber, means for increasing and decreasing the difference between the pressure in the mixing chamber and the pressure under which the fuel liquid is supplied with increase and decrease, respectively, of air flow through the mixing chamber, and automatically operated means for modifying the variations in said pressure difference under variations in air flow through the mixing chamber.

4. Apparatus for supplying a continuous flow under pressure greater than atmosphere of an explosive gaseous mixture of compressed air and the vapor of liquid fuel, comprising a mixing chamber having an air inlet and a mixture outlet, a receptacle for liquid fuel, a passage leading from said receptacle and ending in a nozzle set to discharge into the mixing chamber, means for supplying compressed air to the mixing chamber through the air inlet, means for increasing and decreasing the pressure on the fuel liquid in the receptacle with increase and decrease, respectively, of pressure in the mixing chamber, and means for maintaining a difference between the pressure in the mixing chamber and the pressure on the fuel liquid with the greater pressure on the fuel liquid and for increasing and decreasing such pressure difference with increase and decrease of air flow through the mixing chamber.

5. Apparatus for supplying a continuous flow under pressure greater than atmosphere of an explosive gaseous mixture of compressed air and the vapor of liquid fuel, comprising a mixing chamber having an air inlet and a mixture outlet, a receptacle for liquid fuel, a passage leading from said receptacle and ending in a nozzle set to discharge into the mixing chamber, means for supplying compressed air to the mixing chamber through the air inlet, means for increasing and decreasing the pressure on the fuel liquid in the receptacle with increase and decrease, respectively, of pressure in the mixing chamber, means for maintaining a difference between the pressure in the mixing chamber and the pressure on the fuel liquid with the greater pressure on the fuel liquid and for increasing and decreasing such pressure difference with increase and decrease of air flow through the mixing chamber, and means controlled according to such pressure difference for by-passing air to a point beyond said nozzle to dilute the mixture and to reduce excessive pressure difference.

6. Apparatus for supplying a continuous flow under pressure greater than atmosphere of an explosive gaseous mixture of compressed air and the vapor of liquid fuel, comprising a mixing chamber, a receptacle for liquid fuel, a passage leading from said receptacle and ending in a nozzle set to discharge into the mixing chamber, an adjustable valve controlling said nozzle, means for supplying air under pressure to the mixing chamber, an off-take leading from the mixing chamber, means for increasing and decreasing the pressure on the fuel liquid in the receptacle with increase and decrease, respectively, of pressure in the mixing chamber, and means for maintaining a difference between the pressure in the mixing chamber and the pressure on the fuel liquid with the greater pressure on the fuel liquid and for increasing and decreasing such pressure difference with increase and decrease of air flow through the mixing chamber.

7. Apparatus for supplying a continuous flow under pressure greater than atmosphere of an explosive gaseous mixture of compressed air and the vapor of liquid fuel, comprising a mixing chamber, a receptacle for liquid fuel, a passage leading from said receptacle and ending in a nozzle set to discharge into the mixing chamber, an off-take leading from the mixing chamber, a source of supply of compressed air in communication respectively with said receptacle and with the mixing chamber, and a pressure reducing restricted orifice between said source of air supply and the mixing chamber, whereby the pressure in the mixing chamber is maintained less than the pressure of the source of supply of compressed air and the pressure in said receptacle, and whereby such difference in pressures is caused to increase and decrease with increase and decrease, respectively, of air flow through the mixing chamber.

8. Apparatus for supplying a continuous flow under pressure greater than atmosphere of an explosive gaseous mixture of compressed air and the vapor of liquid fuel, comprising a mixing chamber, a receptacle for liquid fuel, a passage leading from said receptacle and ending in a nozzle set to discharge into the mixing chamber, an off-take leading from the mixing chamber, an air chamber of comparatively large size, a supply inlet for supplying air under pressure to the air chamber, means providing communication between the air chamber and said receptacle, and a pressure reducing restricted orifice for the passage of air from the air chamber to the mixing chamber, whereby the pressure in the mixing chamber will be less than the pressure in the air chamber and in said receptacle, and whereby the difference between such pressures will be caused to increase and decrease with increase and decrease, respectively, of air flow through the mixing chamber.

9. Apparatus for supplying a continuous flow under pressure greater than atmosphere of an explosive gaseous mixture of compressed air and the vapor of liquid fuel, comprising a mixing chamber, a receptacle for liquid fuel, a passage leading from said receptacle and ending in a nozzle set to discharge into the mixing chamber, an off-take leading from the mixing chamber, an air chamber of comparatively large size, a supply inlet for supplying air under pressure to the air chamber, means providing communication between the air chamber and said receptacle, a pressure reducing restricted orifice for the passage of air from the air chamber to the mixing chamber, whereby the pressure in the mixing chamber will be less than the pressure in the air chamber and in said receptacle, and whereby the difference between such pressures will be caused to increase and decrease with increase and decrease, respectively, of air flow through the mixing chamber, and adjusting means for varying the size of said pressure reducing orifice to vary such difference in pressures.

10. Apparatus for supplying a continuous flow under pressure greater than atmosphere of an explosive gaseous mixture of compressed air and the vapor of liquid fuel, comprising a mixing chamber, a receptacle for liquid fuel, a passage leading from said receptacle and ending in a nozzle set to discharge into the mixing chamber, an off-take leading from the mixing chamber, an air chamber of comparatively large size, a supply inlet for supplying air under pressure to the air chamber, means providing communication between the air chamber and said receptacle, a pressure reducing restricted orifice for the passage of air from the air chamber to the mixing chamber, whereby the pressure in the mixing chamber will be less than the pressure in the air chamber and in said receptacle, and whereby the difference between such pressures will be caused to increase and decrease with increase and decrease, respectively, of air flow through the mixing chamber, and a passage for by-passing air from the air chamber to a point beyond the nozzle controlled automatically to reduce the increase in such difference in pressures with increasing air flow through the mixing chamber.

In testimony whereof I have hereunto set my hand in the presence of two subscribing witnesses.

CHARLES E. LUCKE.

Witnesses:
W. S. CALDWELL,
A. L. KENT.